July 30, 1968  H. A. ÅKE WALLGREN ET AL  3,394,718

DISH WASHING APPARATUS HAVING IMPROVED SPRAY MEANS

Filed April 14, 1965

INVENTORS
Harald Anton Åke Wallgren
BY Sven Eric Gahlin
      M. Forander
their ATTORNEY

United States Patent Office 3,394,718
Patented July 30, 1968

3,394,718
DISH WASHING APPARATUS HAVING
IMPROVED SPRAY MEANS
Harald Anton Åke Wallgren, Alvsjo, and Sven Eric Juhlin, Norsborg, Sweden, assignors to Aktiebolaget Electrolux, Stockholm, Sweden, a corporation of Sweden
Filed Apr. 14, 1965, Ser. No. 448,136
Claims priority, application Sweden, Apr. 17, 1964, 4,761/64
5 Claims. (Cl. 134—148)

Our invention relates to dish washing apparatus having improved spray means.

It already has been proposed to provide spraying devices for dish washing apparatus in which dishes to be cleansed are sprayed by liquid spray jets discharged through openings in the walls of elongated hollow members to which the liquid is conducted under pressure.

The object of our invention is to provide an improved spraying device of this type for effectively discharging liquid spray jets toward dishes to be cleansed. We accomplish this by providing a spraying device comprising a pair of elongated hollow members which are disposed alongside one another, the hollow members having openings in the walls thereof for discharging liquid spray jets toward the dishes to be cleansed, and conducting liquid under pressure to the hollow members by means which includes connections for conducting liquid to one of the members for flow therethrough in one direction and for conducting liquid to the other of the members for flow therethrough in the opposite direction.

The above and other objects and advantages of our invention will become apparent as the following description proceeds, and the features of novelty which characterize our invention will be pointed out with particularity in the claims annexed to and forming a part of this specification.

For a better understanding of our invention, reference may be had to the following description taken in connection with the accompanying drawing, in which.

Figure 1:
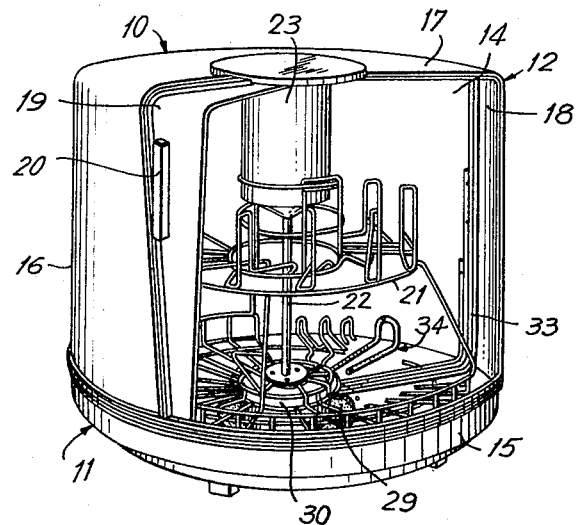
FIG. 1 is a side perspective view of dish washing apparatus embodying our invention, the cover being open to illustrate the interior of the apparatus.

Referring to the drawing, the dish washing apparatus illustrated comprises a cylindrical casing 10 having a base 11 and an upper part 12 defining a space 14. The base 11 includes a short upstanding side wall 15 which is connected to the bottom edge of the upper part 12. The upper part 12 is of inverted cup shape having an upstanding wall 16 and a flat top 17. The upper part 12 is formed with a wide angle opening 18 formed in the upstanding side wall 16 and flat top 17.

A door 19 having the same configuration as the side wall 16 and top 17 and provided with a handle 20 is mounted for sliding movement in any suitable manner within the upstanding side wall 15 of the bottom 11. The door 19 is movable from and to its open position illustrated in FIG. 1, a dish rack 21 being accessible when the door is open. The dish rack 21 is mounted for rotation within the casing 10 and arranged to be driven by a vertical shaft (not shown) which extends upward through a hollow tube 22 within the casing 10. The shaft at its upper end is connected to an enclosed electric motor 23 which is fixed to the underside of the top 17.

Liquid is supplied to the dish washing apparatus through a liquid supply line which includes a flexible hollow tube 24 having a resilient coupling 25 at its outer free end adapted to be connected to a faucet or water tap. Liquid is conducted through tube 24, a vacuum breaker 26 and a conduit 27 to the side wall of a relatively shallow pan 28 which forms a sump 29 at the extreme bottom of the dish washing apparatus.

Figure 3:
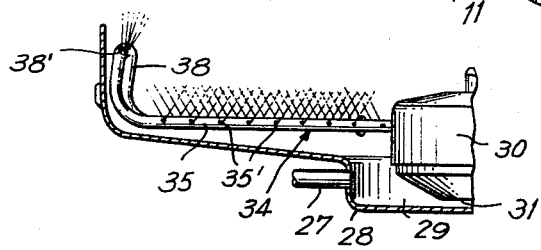
FIG. 3 is a fragmentary vertical sectional view taken at line 3—3 of FIG. 2 to illustrate details more clearly.

The electric motor 23 drives the rotatable dish rack 21, as explained above, and also a pump 30 which is connected to the lower end of the vertical shaft. As best shown in FIG. 3, the inlet 31 of pump 30 is directed downward toward the bottom of the sump 29 and is at a level below the region at which liquid is delivered to the sump through the conduit 27. Liquid from the pump 30 is delivered through a number of apertured tubes 33 which are located within the space 14 for discharging liquid spray jets toward dishes positioned on the rotatable dish rack 21.

In accordance with our invention we provide a spraying device 34 which is disposed beneath the dish rack 21 and connected to receive liquid under pressure from the pump 30 for discharging liquid spray jets upward in the space 14. The spraying device 34 comprises a pair of elongated hollow members 35 and 36 which are disposed alongside one another and formed with openings 35' and 36', respectively, at the top portions thereof for directing liquid spray jets upward through the dish rack 21.

The inner end of the hollow member 35 is connected at 37 to the pump 30 to receive liquid under pressure therefrom. The outer ends of the hollow members 35 and 36 are connected by a cross connection 38 which is of inverted U shape and projects upward within the space 14. Liquid discharged from the outer outlet end of the hollow member 35 flows through the cross connection 38 into the outer inlet end of the hollow member 36. The inner end of the hollow member 36 is closed by a plug 39.

Figure 2:
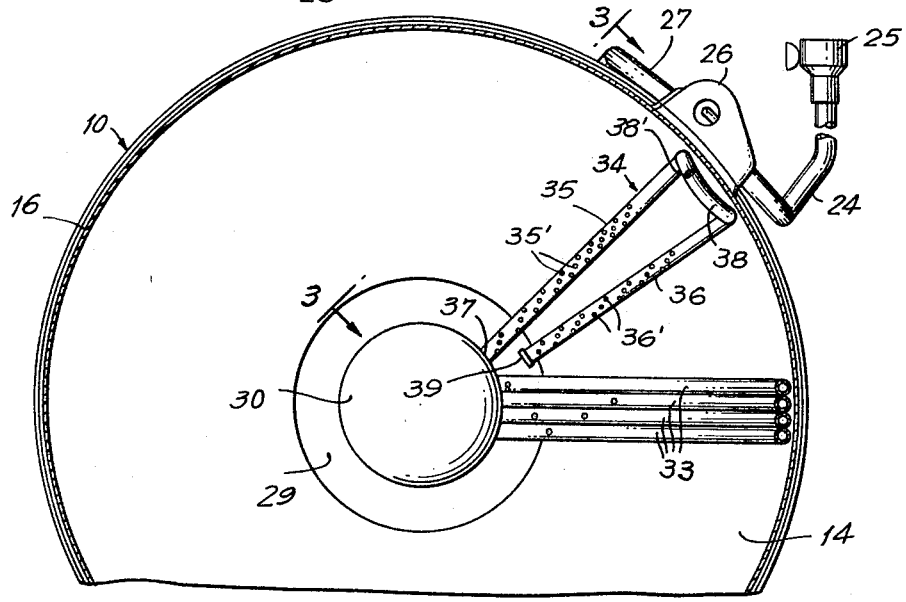
FIG. 2 is a horizontal sectional view of the dish washing apparatus of FIG. 1 with the dish rack removed.

It will now be understood that liquid under pressure flows in one direction through the hollow member 35 and in the opposite direction through the hollow member 36. With this arrangement liquid is sprayed upward in the space 14 in all directions for effectively spraying dishes which are carried on the dish rack 21. As seen in FIGS. 2 and 3, the cross connection 38 is also formed with openings 38' which are of larger size than the openings 35' and 36'.

The hollow members 35 and 36 and cross connection 38 may be formed of piping of U form in which the arms of the U provide the elongated hollow members 35 and 36 and the closed end of the U forms the cross connection 38. The cross connection 38 extends vertically upward in a plane which is substantially perpendicular to a plane passing through the axes of the horizontally disposed hollow members 35 and 36.

The direction in which liquid flows through the hollow members 35 and 36 influences the particular manner in which the individual spray jets are discharged upward through the openings 35' and 36', respectively. By providing the hollow members 35 and 36 which are disposed alongside of and substantially parallel to one another and conducting liquid under pressure in opposite directions through the hollow members, the individual liquid spray jets are discharged in such a manner that liquid is sprayed upward in all directions in the space 14 to promote distribution of the sprayed liquid.

Although we have shown and described a particular embodiment of our invention, we do not desire to be limited to the particular arrangement set worth. For example, the elongated hollow members 35 and 36 may be bent instead of straight and the openings formed in the top portions thereof may be arranged to direct the individual liquid jets upward in the space 14 toward a vertically extending zone between the hollow members 35 and 36. Therefore, we intend in the following claims to cover all modifications which do not depart from the spirit and scope of the invention.

We claim:
1. Dish washing apparatus of the class described having, in combination,
   (a) an upright housing including an upstanding side wall and top and bottom walls,
   (b) rack means for supporting articles to be washed, means for mounting the rack means for rotation about a vertical axis,
   (c) a pump which has an inlet and outlet for water,
   (d) means functioning to rotate the rack means and drive the pump to provide a source of supply of water under pressure at the outlet thereof,
   (e) spray means which is disposed in the housing and arranged to discharge water under pressure against articles supported on the rack means,
   (f) the spray means comprising first and second elongated hollow members which are horizontally disposed alongside one another beneath the rack means and extend radially within the housing between the upstanding side wall thereof and the vertical axis about which the rack means rotates,
   (g) the first and second hollow members having their inner ends adjacent to one another and their outer ends adjacent to one another,
   (h) the first hollow member having water inlet and outlet ends, respectively, and the second hollow member having a water inlet end and means closing the opposite end thereof, the water outlet end of the first hollow member and the water inlet end of the second hollow member being adjacent to one another,
   (i) means connecting the water inlet end of the first hollow member to the outlet of the pump,
   (j) conduit means connecting the opposite water outlet end of the first hollow member and the water inlet end of the second hollow member for water to flow under pressure in one direction through the first hollow member and to flow under pressure in the opposite direction through the second hollow member,
   (k) the first and second hollow members having openings between the inner and outer ends thereof for discharging water upward therefrom toward the rack means for spraying water against articles supported thereon,
   (l) the first and second hollow members and openings therein functioning to promote distribution of water discharged through the openings responsive to water under pressure flowing radially in one direction in the housing through the first hollow member between its water inlet and outlet ends and to water under pressure flowing radially in the opposite direction in the housing through the second hollow member from its water inlet end to its opposite closed end, and
   (m) the first and second hollow members being horizontally disposed in a first plane and the conduit means connecting the water outlet end of the first hollow member and water inlet end of the second hollow member extending upward from the first and second hollow members and being disposed in a vertically extending second plane transverse to the first plane,
   (n) the connecting conduit means having openings for discharging water therefrom toward the rack means for spraying water against articles supported thereon.

2. Apparatus as set forth in claim 1 in which the connecting conduit means is of inverted U shape, the first and second hollow members and connecting conduit means being in the form of a U with the first and second hollow members constituting the opposing arms of the U and the connecting conduit means constituting the closed end of the U.

3. Apparatus as set forth in claim 1 in which the openings in the connecting conduit means are of larger size than the openings in the first and second hollow members.

4. Dish washing apparatus of the class described having, in combination,
   (a) an upright housing including an upstanding side wall and top and bottom walls,
   (b) rack means for supporting articles to be washed, means for mounting the rack means for rotation about a vertical axis,
   (c) a pump which has an inlet and outlet for water,
   (d) means functioning to rotate the rack means and drive the pump to provide a source of supply of water under pressure at the outlet thereof,
   (e) spray means which is disposed in the housing and arranged to discharge water under pressure against articles supported on the rack means,
   (f) the spray means comprising first and second elongated hollow members which are horizontally disposed alongside one another beneath the rack means and extend radially within the housing between the upstanding side wall thereof and the vertical axis about which the rack means rotates,
   (g) the first and second hollow members having their inner ends adjacent to one another and their outer ends adjacent to one another,
   (h) the first hollow member having water inlet and outlet ends, respectively, and the second hollow member having a water inlet end and means closing the opposite end thereof, the water outlet end of the first hollow member and the water inlet end of the second hollow member being adjacent to one another,
   (i) means connecting the water inlet end of the first hollow member to the outlet of the pump,
   (j) conduit means connecting the opposite water outlet end of the first hollow member and the water inlet end of the second hollow member for water to flow under pressure in one direction through the first hollow member and to flow under pressure in the opposite direction through the second hollow member,
   (k) the first and second hollow members having openings between the inner and outer ends thereof for discharging water upward therefrom toward the rack means for spraying water against articles supported thereon,
   (l) the first and second hollow members and openings therein functioning to promote distribution of water discharged through the openings responsive to water under pressure flowing radially in one direction in the housing through the first hollow member between its water inlet and outlet ends and to water under pressure flowing radially in the opposite direction in the housing through the second hollow member from its water inlet end to its opposite closed end,
   (m) the pump being disposed beneath the rack means and at the vertical axis about which it rotates,
   (n) the water inlet and outlet ends of the first hollow member respectively being disposed at the inner and outer ends thereof, the water inlet end and the closed end of the second hollow member respectively being disposed at the outer and inner ends thereof,
   (o) the conduit means connecting the water outlet end of the first hollow member and the water inlet end of the second hollow member being disposed adjacent to the upstanding side wall of the housing, and
   (p) the first and second hollow members being horizontally disposed in a first plane and the conduit means connecting the water outlet end of the first hollow member and water inlet end of the second hollow member extending upward from the first and second hollow members and being disposed in a vertically extending second plane transverse to the first plane,
   (q) the connecting conduit means having openings for discharging water radially inward from the upstanding side wall of the housing toward the rack means for spraying water against articles supported thereon.

5. Apparatus as set forth in claim 4 in which the connecting conduit means is of inverted U shape and the openings therein are of larger size than the openings in the first and second hollow members.

References Cited

UNITED STATES PATENTS

| | | | |
|---|---|---|---|
| 1,032,860 | 7/1912 | Possons | 239—553.5 |
| 1,625,623 | 4/1927 | O'Dowd | 239—559 |
| 1,877,357 | 9/1932 | Moor | 239—560 |
| 2,574,069 | 11/1951 | Stanley | 134—153 X |
| 3,060,946 | 10/1962 | Lantz | 134—148 X |
| 3,298,207 | 1/1967 | Bannon | 134—93 X |

FOREIGN PATENTS

| | | |
|---|---|---|
| 389,731 | 7/1908 | France. |
| 99,550 | 8/1940 | Sweden. |

M. HENSON WOOD, Jr., *Primary Examiner.*

VAN C. WILKS, *Assistant Examiner.*